United States Patent
Virnig et al.

[11] Patent Number: 6,035,562
[45] Date of Patent: Mar. 14, 2000

[54] U-BLADE IMPLEMENT

[75] Inventors: Dean H. Virnig, Pierz; Sri K. Sankaran, Minneapolis; John F. Thuente, St. Paul, all of Minn.

[73] Assignee: Virnig Manufacturing, Inc., Pierz, Minn.

[21] Appl. No.: 09/186,239

[22] Filed: Nov. 4, 1998

Related U.S. Application Data

[60] Provisional application No. 60/085,793, May 18, 1998, and provisional application No. 60/069,608, Dec. 15, 1997.

[51] Int. Cl.$^7$ ........................................ E02F 3/36
[52] U.S. Cl. .............................. 37/302; 37/446
[58] Field of Search ................ 37/302, 446, 447; 172/772, 772.5, 701.3, 701.1

[56] References Cited

U.S. PATENT DOCUMENTS

| | | |
|---|---|---|
| D. 201,756 | 7/1965 | Abbott . |
| D. 216,874 | 3/1970 | Cline . |
| D. 335,131 | 4/1993 | Devaney ........................ D15/32 |
| D. 335,883 | 5/1993 | Devaney ........................ D15/32 |
| D. 358,401 | 5/1995 | Devaney . |
| 2,063,698 | 12/1936 | Roe ............................... 37/411 |
| 2,323,434 | 7/1943 | Williams ........................ 414/702 |
| 2,652,639 | 9/1953 | Kluckhohn ..................... 37/302 |
| 2,669,065 | 2/1954 | Clegg ............................. 37/302 |
| 2,703,044 | 3/1955 | Adair . |
| 2,770,076 | 11/1956 | Kluckhohn ..................... 37/302 |
| 3,512,276 | 5/1970 | Juhl . |
| 3,672,521 | 6/1972 | Bauer et al. . |
| 4,216,833 | 8/1980 | Fezatt et al. . |
| 4,271,611 | 6/1981 | Paul ............................... 171/62 |
| 4,321,761 | 3/1982 | Hedblom ........................ 37/302 |
| 4,723,609 | 2/1988 | Curtis . |
| 4,749,048 | 6/1988 | Kelly . |
| 4,819,349 | 4/1989 | Mensch . |
| 4,895,211 | 1/1990 | Harris ............................ 172/271 |
| 4,903,418 | 2/1990 | Loudon . |
| 4,936,392 | 6/1990 | Kitchin . |
| 5,036,607 | 8/1991 | Taylor . |
| 5,133,268 | 7/1992 | Delisle .......................... 37/302 |

OTHER PUBLICATIONS

The Green Hoe Brochure and Price Listing, The Green Hoe Company, Inc., Mar. 1997.

*Primary Examiner*—Thomas B. Will
*Assistant Examiner*—Kristine M Markovich
*Attorney, Agent, or Firm*—Patterson & Keough, P.A.

[57] ABSTRACT

An improved U-Blade implement, in one preferred embodiment, having fixed trailing and leading earth-piercing points on its U-shaped blade, integrated with support arms and a back plate. The back plate is generally planar, with a rear side of the back plate configured for attachment to a motorized vehicle, such as a skid steer.

7 Claims, 2 Drawing Sheets

000
U-BLADE IMPLEMENT

CROSS-REFERENCE TO RELATED APPLICATIONS

The subject matter of this application is related to the subject matter of U.S. application Ser. No. 60/085,793, filed May 18, 1998, and U.S. application Ser. No. 60/069,608, filed Dec. 15, 1997, both of which are incorporated by reference herein in their entirety and the benefit of which is claimed under 35 U.S.C. § 119(e).

TECHNICAL FIELD

The present invention is a U-blade designed to be mounted on a number of different types of vehicles. More particularly, the U-blade is useful for digging in both a forward and a rearward direction.

BACKGROUND OF THE INVENTION

U-blades have been used in the past. The most common use for such blades is in digging under the root ball of a shrub or small tree and removing the shrub or small tree with the root ball in tact for replanting at a different location. Another use for such blades is to support conduits for lowering into a trench dug in the ground.

There is a need in the industry for a U-blade that is readily attachable and detachable to a number of different types of vehicles and one that is designed to facilitate digging a trench. Trenching is typically done with the trailing edge of the blade with the vehicle moving away from the blade as the trench is dug. A blade that is useful for such trenching operations must have substantial vertical (transverse to the bottom of the blade) strength and be substantially rigid in a direction that is lateral to the orientation of the trench. Additionally, such a blade must readily penetrate the ground in which the trench is being made. The ability to readily penetrate the ground is necessary for trenching, as well as for digging using the most forward potion of the U-Blade.

SUMMARY OF THE INVENTION

The U-blade of the present invention substantially meets the aforementioned needs of the industry. The U-blade has substantial lateral rigidity as well as substantial vertical strength. A rear facing point is included to readily penetrate the ground in order to efficiently dig a trench, as well a more protruding front facing point to facilitate forward digging.

DETAILED DESCRIPTION OF THE DRAWINGS

DETAILED DESCRIPTION OF THE INVENTION

Figure 1:
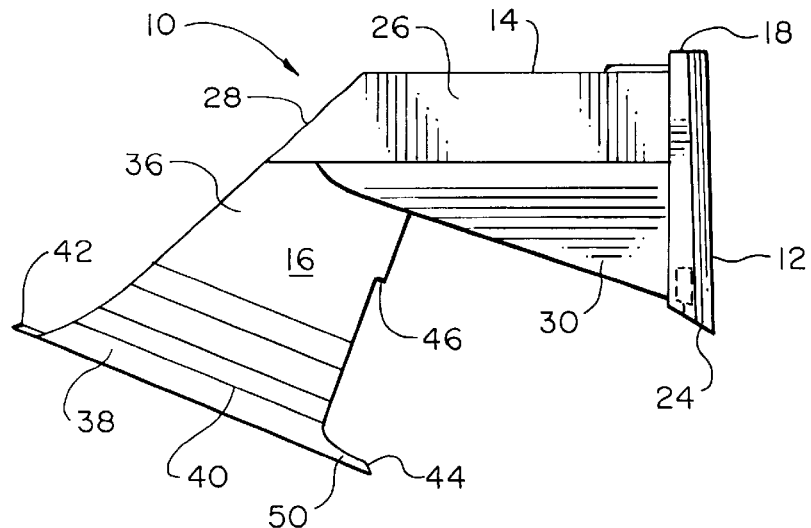
FIG. 1 is a side elevational view of one embodiment of the improved U-blade of the present invention.

The U-blade of the present invention is shown generally at 10 in FIGS. 1, 2, 3 and 4. The U-blade 10 has three major subcomponents: back plate 18, support arm 14, and blade 16.

A typical attaching apparatus 12 is as disclosed U.S. Pat. No. 3,672,521. Such a quick attachment mechanism 12 is incorporated into back plate 18 so that the invention may be readily engaged to and disengaged from a universal implement attachment on a skid steer type vehicle. Alternatively, the attaching apparatus may provide attaching points for a three point hitch typically used on farm tractors. A further alternative is to provide attaching points that are designed to be grasped by a three point hitch having a "quick-hitch" type of attachment. The attaching apparatus may also accommodate coupling to the lift arms that support a bucket-type implement for a tractor. U-blade 10 of the present invention may also be used with other convenient types of attachments for engagement with other types of vehicles.

As disclosed in FIGS. 1, 2, 3 and 4 back plate 18 incorporates attaching apparatus 12, back plate 18 being substantially planar. Back plate 18 may have a central aperture 54 defined therein, visible in FIG. 4.

Back plate 18 preferably incorporates, at an upper margin, a laterally directed upper support tube 20, typically welded in place. An elongate section of mesh 21 may be welded to the upper surface of upper support tube 20 in order to provide a convenient skid-free surface for an operator to stand on U-blade 10. A laterally direct lower support tube 22 is preferably welded to back plate 18. Both upper support tube 20 and lower support tube 22 are preferably formed of rectangular section box tubing.

Lower plate 24 is welded at an inclined angle to back plate 18. Lower plate 24 preferably has a plurality of apertures (not shown) defined therein for engagement by over-center pins mounted on the attaching device of the skid steer vehicle.

There are two generally parallel and spaced-apart support arms 14. In one preferred embodiment, support arms 14 are transversely directed generally perpendicular with respect to back plate 18 (FIG. 1). In another preferred embodiment shown in FIG. 3, support arms 14 are directed in a downward direction such that the inside angle between arms 14 where attachment is made to front 17 of back plate 18 is less than 90 degrees. This configuration allows a shortened depending blade support 36, advantageously providing a more rigid blade configuration with the use of less material.

Figure 3:
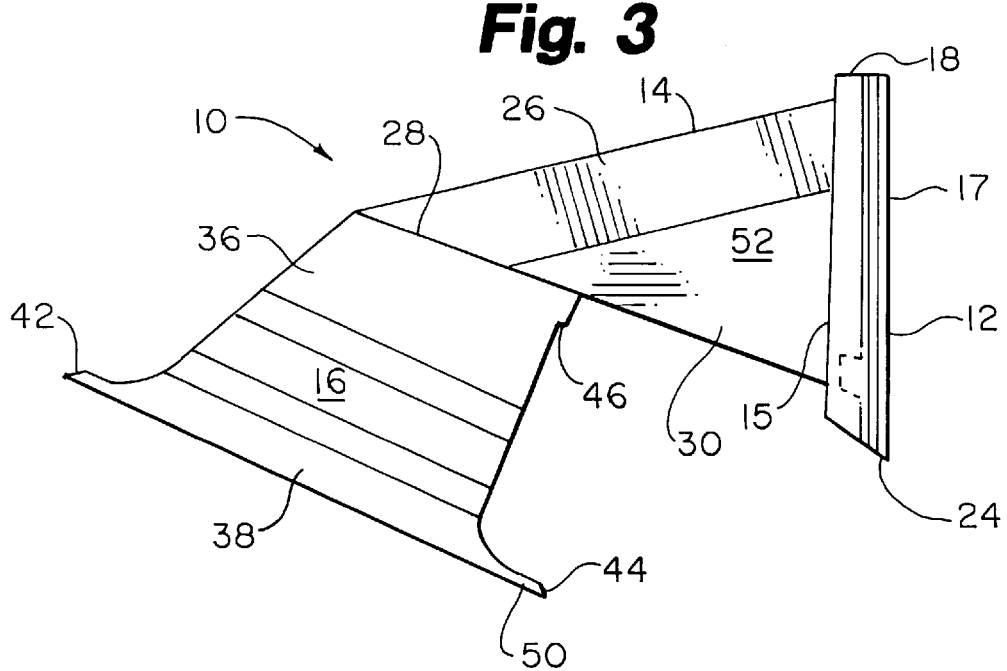
FIG. 3 is a side elevational view of another embodiment of the improved U-blade.
Figure 4:
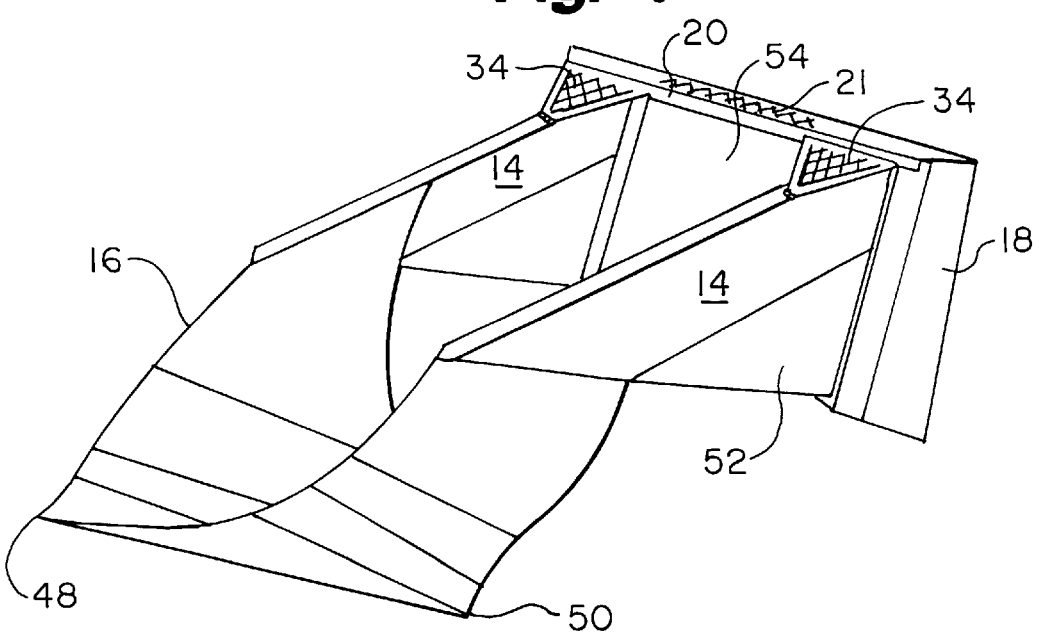
FIG. 4 is a perspective view of the embodiment depicted in FIG. 3.

Each of support arms 14 has a tubular arm that is preferably formed of a rectangular-section steel tube. A first end of tubular arm 26 is welded to back plate 18. A second end of tubular arm 26 is defined by a declined tube end 28. In a preferred embodiment, the declination of tube end 28 is co-linear with the bottom edge of vertical support gusset 30 such that the two form triangular member 52, as shown in FIGS. 3 or 4. The triangular configuration is significant in that it provides additional strength and rigidity to U-blade 10 by utilizing the known strength of such a configuration.

In order to provide the necessary vertical strength of U-blade 10, each of support arms 14 includes large vertical support gusset 30. Vertical support gusset 30 is welded at a first margin to back plate 18 and is welded at a second margin to the underside of tubular arm 26. Triangular member 52 provides further strength benefit in that the configuration shortens the distance from lower plate 24 to the weld at a second margin where support arm 14 and vertical support gusset 30 are connected. This reduced distance lessens the pressure placed upon U-blade 10 and support arms 14 during use. A further benefit is that the triangular configuration requires utilization of less raw material for construction than do previous designs.

Figure 2:
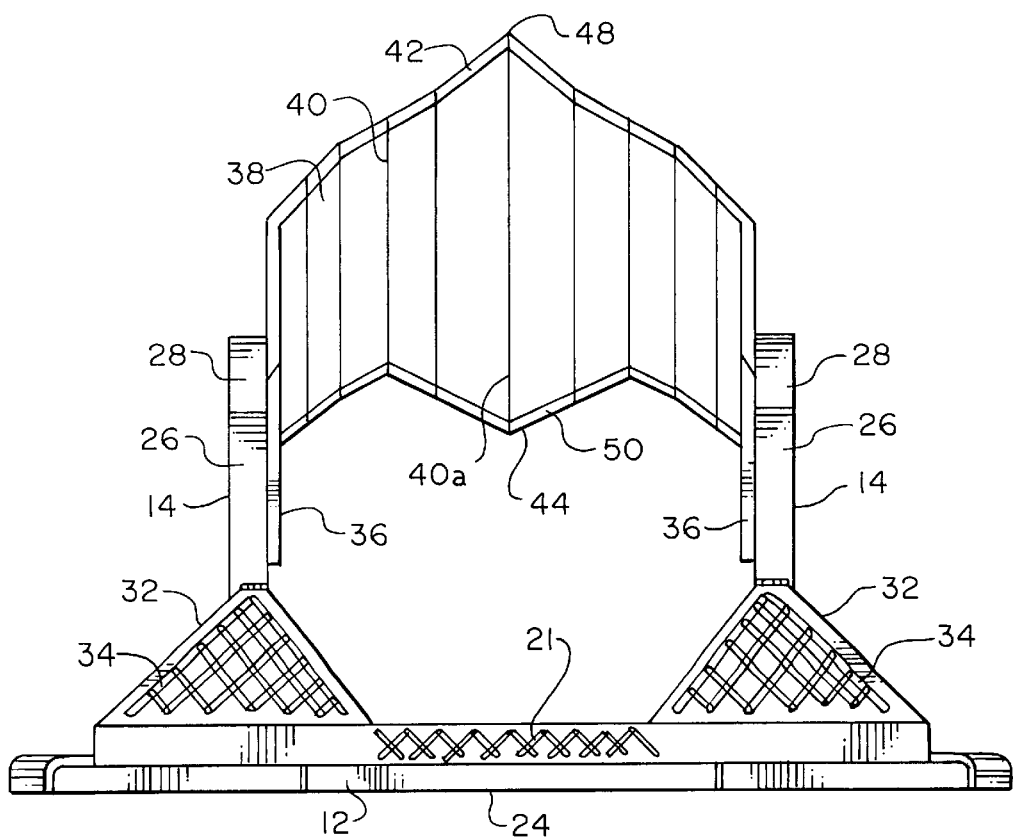
FIG. 2 is a top plan view of the U-blade of the present invention.

Referring to FIGS. 2 and 4, lateral support of each of support arms 14 is provided by triangular lateral support gusset 32. Lateral support gusset 32 is preferably made of steel plate, welded to upper support tube 20 and to respective tubular arm 26. Steel mesh 34 is preferably welded to the upper surface of lateral support gusset 32 in order to provide a suitable, skid-free surface for an operator to stand on U-blade 10.

Referring to FIGS. 1 through 4, blade 16 of U-blade 10 is preferably made of a single sheet of steel plate that is suitably bent to provide a pair of depending supports 36 and blade portion 38. Depending supports 36 are preferably welded to the inward-directed surface of each tubular arms 26. Other methods of attachment, such as bolting the blade to the arms, or a combination of bolting and welding, will be apparent to those skilled in the art.

A lower, generally semi-circular, bended portion 38 of blade 16 is preferably formed by a series of spaced-apart and generally parallel bends 40. In a preferred embodiment, bended portion 38 is formed by more than six bends. Center bend 40a is preferably formed at the bottom margin of blade portion 38 to assist in penetration of compacted soil.

A leading edge bevel 42 is preferably formed on the leading edge of blade portion 38 in order to provide a sharp surface to facilitate digging beneath the root ball of the vegetation.

A trailing edge bevel 44 is defined on the trailing edge of blade portion 38 is order to assist in readily digging in a rearward direction in order to define a trench in the ground. A notch 46 is defined in the trailing edge of blade portion 38 at the terminus of trailing edge bevel 44.

A leading edge point 48 is a provided in the leading edge of blade portion 38. Similarly, a trailing edge point 50 is defined in the trailing edge of blade portion 38. It is the trailing edge point 50 that greatly enhances the utility of U-blade 10 by facilitating the rearwardly-directed trenching action of U-blade 10. The fixed, integral trailing edge point 50 on rigid U-shaped blade 16 is a substantial departure from the design of existing U-blades and is one feature that sets improved U-blade 10 of the present invention apart from such prior art U-blades in both appearance and function.

The trailing edge point 50 is preferably formed unitary and integral with blade portion 38. Such formation simplifies forming blade portion 38 during manufacture of U-blade 10. Further, such formation avoids the difficulty presented by bolted-on prior art points. After use of such points, the bolts become damaged and must be removed with a torch. Thus, integral point 50 is typically much stronger than a bolt-on point of the prior art. Preferred center bend 40a is extended through the trailing edge point 50 so that point 50 has a generally V-shaped cross section. More bends in point 50 may be provided as desired.

In a preferred embodiment, as depicted in FIGS. 3 and 4, the angle of intersection of arms 14 and back plate 12 being less than 90 degrees, providing the increased strength of U-blade 10 to facilitate trenching with a rearward motion of the vehicle and utilizing the enhanced soil penetration characteristics of trailing edge point 50.

When U-blade 10 is used conventionally to dig under the root ball of a plant, such as a shrub, the leading edge point 48 is primarily used to penetrate the soil under the root ball. As the shrub is lifted out of the hole, formed by such penetration, the increased bottom area of blade portion 38 provided by the upward-directed surface of trailing edge point 50 works to better support the plant root ball without having to increase the size of depending blade supports 36.

Aperture 54 (FIG. 4) is defined in back plate 18. Aperture 54 provides a direct line of sights from an operator's station in the vehicle coupled to U-blade 10 to blade portion 38 in order that the operator may clearly view the work being performed by U-blade 10. Similar aperture 54 may be defined in the embodiments of FIGS. 1 and 2.

What is claimed is:

1. A U-blade implement for use in penetrating soil, comprising:

a U-shaped blade, the blade having an integral, unitary fixed leading edge point and an integral, unitary fixed trailing edge point, the blade being defined by a plurality of spaced-apart, generally parallel, bend lines, and said blade including a center bend line at a lower margin thereof;

a pair of parallel support arms, each arm having a first and a second end, each of said arms being rigidly, integrally attached to an opposite upper portion of the U-shaped blade generally at the first ends thereof; and a back plate having a front side and a rear side, said back plate being generally planar, the second end of the arms being fixedly, integrally attached to the front side of said back plate proximate a back plate upper margin and the rear side of the back plate being configured for attachment to a motorized vehicle, the inside angle of intersection between the second end of each of the arms and the back plate being less than generally 90 degrees.

2. The implement of claim 1 wherein each arm incorporates a generally triangular shaped vertical support gusset integrated with the back plate.

3. The implement of claim 1 wherein the arms and back plate include integrated vertical support gussets.

4. The implement of claim 1 wherein lateral support gussets are operably integrated on the arms and back plate.

5. The implement of claim 4 wherein the back plate and lateral support gussets incorporate a means for providing at least one skid-resistant surface suitable for use as steps.

6. The implement of claim 5 wherein mesh-type material is incorporated as the means for providing the at least one skid-resistant surface.

7. A U-blade implement, comprising:

a U-shaped blade, the blade having a lower generally semi-circular blade portion, the lower blade portion further including an integral, unitary fixed leading edge point and a permanently fixed integral trailing edge point, and an upper portion consisting of two spaced-apart and parallel depending supports, said depending supports including attachment means for integral, unitary attachment to support arms;

a pair of parallel support arms, each arm having a first and a second end, each of said arms including attachment means for integral unitary attachment to opposite depending supports of the U-shaped blade generally at the first ends thereof; and a back plate, said back plate being generally planar and defining back plate aperture, the aperture providing a line of sight from an operator's station in a motorized vehicle to the lower blade portion, said back plate having a front side and a rear side, the second end of the arms being fixedly attached to the front side of said back plate at an upper margin thereof, and the rear side of the back plate including attachment means for attachment to the motorized vehicle, the inside angle of intersection of the support arms and the back plate being generally less than 90 degrees.

* * * * *

UNITED STATES PATENT AND TRADEMARK OFFICE
CERTIFICATE OF CORRECTION

PATENT NO : 6,035,562
DATED : March 14, 2000
INVENTOR(S) : Virnig et al.

It is certified that error appears in the above-identified patent and that said Letters Patent are hereby corrected as shown below:

Column 1, line 38, delete "potion" and insert --portion--.

Column 1, line 45, after "well" insert --as--.

Column 1, line 66, after "disclosed" insert --in--.

Column 3, line 26, delete "is" and insert --in--.

Column 3, line 30, after "is" delete "a".

Signed and Sealed this

Third Day of April, 2001

*Attest:*

NICHOLAS P. GODICI

*Attesting Officer*   Acting Director of the United States Patent and Trademark Office